May 2, 1950 H. E. KALLMANN 2,505,862

TELEVISION RECEIVER

Filed Oct. 25, 1946 3 Sheets-Sheet 1

INVENTOR.

Heinz E. Kallmann

BY

Michael S. Striker his Agent

May 2, 1950 H. E. KALLMANN 2,505,862

TELEVISION RECEIVER

Filed Oct. 25, 1946 3 Sheets-Sheet 2

INVENTOR.

Heinz E. Kallmann

BY

Michael S. [illegible]

his agent

May 2, 1950 H. E. KALLMANN 2,505,862

TELEVISION RECEIVER

Filed Oct. 25, 1946 3 Sheets-Sheet 3

INVENTOR.
Henry E. Kallmann
BY
Michael S. Striker
his Agent

Patented May 2, 1950

2,505,862

UNITED STATES PATENT OFFICE 2,505,862

TELEVISION RECEIVER

Heinz E. Kallmann, New York, N. Y.

Application October 25, 1946, Serial No. 705,717

13 Claims. (Cl. 250—40)

My present invention relates to television receivers and more particularly to push button switch arrangements used in such receivers.

It is an object of my present invention to provide a new type of push button tuning arrangements for television receivers.

It is another object of my present invention to provide a push button switch arrangement with which it is possible to cover frequencies within a wide range, e. g. between 40 and 220 megacycles.

It is a further object of my present invention to provide a new type of television receiver provided with a radio frequency amplifier stage to suppress radiation from the local oscillator and to improve the signal-to-noise ratio.

Furthermore, it is also an object of my present invention to provide a television receiver the radio frequency amplifier stage of which is tuned to the received carrier frequency.

It is also an object of my present invention to provide a television receiver with a local oscillator stage the frequency of which is so stabilized that no tuning correction is needed during operation of the receiver.

Finally, it is also an object of my present invention to provide for receivers of the above type a push button tuning assembly which is of small dimensions suitable for the newly developed miniature amplifier tubes and constructed so as to reduce wiring reactances at the high frequencies involved.

With the above objects in view, my present invention comprises in a television receiver the combination of an electrical television receiver circuit, at least one stationary contact member included in this receiver circuit, a movable push button switch member, an electrical tuning element forming part of the receiver circuit and combined with, e. g. carried by this movable push button switch member, at least one movable contact member combined with, e. g. mounted on the above mentioned movable push button switch member permanently connected with the electrical element combined with, e. g. carried by this switch member, and guiding means constructed and arranged so as to be adapted to guide the switch member between inoperative position in which the movable contact member combined with, e. g. mounted on the switch member is out of contact with the stationary contact member mentioned above and operative position in which this movable contact member is moved into contact with the stationary contact member.

In accordance with a preferred embodiment of my present invention, the movable contact member or members are mounted directly on the electrical tuning element combined with, e. g. carried by the switch member. Usually, such tuning elements include a tuning coil and in this event the movable contact members are connected directly to the ends of the coil.

I have found it advisable to provide two movable contact members for each tuning element combined with, e. g. carried by the switch member and two corresponding stationary contact members adapted to engage these movable contact members when the switch member is in operative position.

A television receiver of the particular type proposed by me comprises usually three stages, namely, a radio frequency amplifier stage, a radio frequency mixer stage and a local oscillator stage. Each of the first two stages mentioned includes a tuning coil, while the local oscillator stage includes a line section of well known type. I have found it advisable to use for television receivers of the type proposed by me and described below in detail line sections of the type disclosed in my co-pending U. S. patent application Serial No. 679,920, filed June 28, 1946, and entitled improvements in "Line sections."

The above mentioned three tuning elements, namely, the two tuning coils and the line section, are combined, in accordance with my present invention, with the movable switch member, e. g. mounted on and carried by the same. Each of these elements is provided with a pair of contact members which move together with the movable switch member when the switch is operated. Furthermore, in a receiver of this type, I provide three pairs of stationary contact members corresponding to the three pairs of movable contact members mentioned above and arrange these stationary contact members so as to engage the corresponding movable contact members when the movable switch member is in operative position.

By providing a switch arrangement of the above type it is possible to obtain substantial advantages compared with arrangements of conventional type: first, it is possible to reduce and keep the length of the connecting wires to a minimum; and second, the number of contact members in each path is halved compared with the usual type of push button switches connecting fixed tuning elements with other fixed circuit elements by sliding twin contacts.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
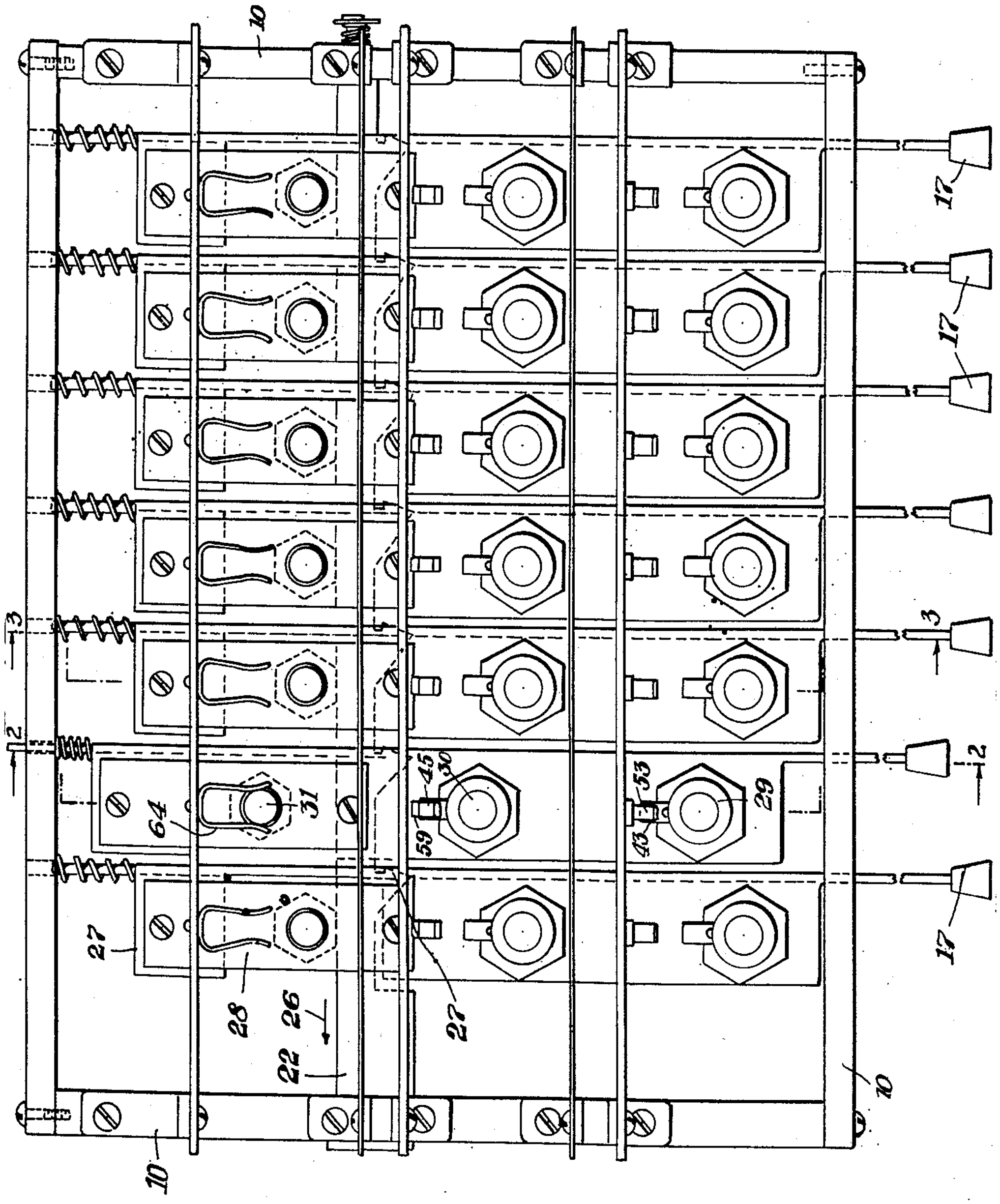
Fig. 1 is a top view of a push button tuning arrangement for a television receiver according to my present invention.
Figure 2:
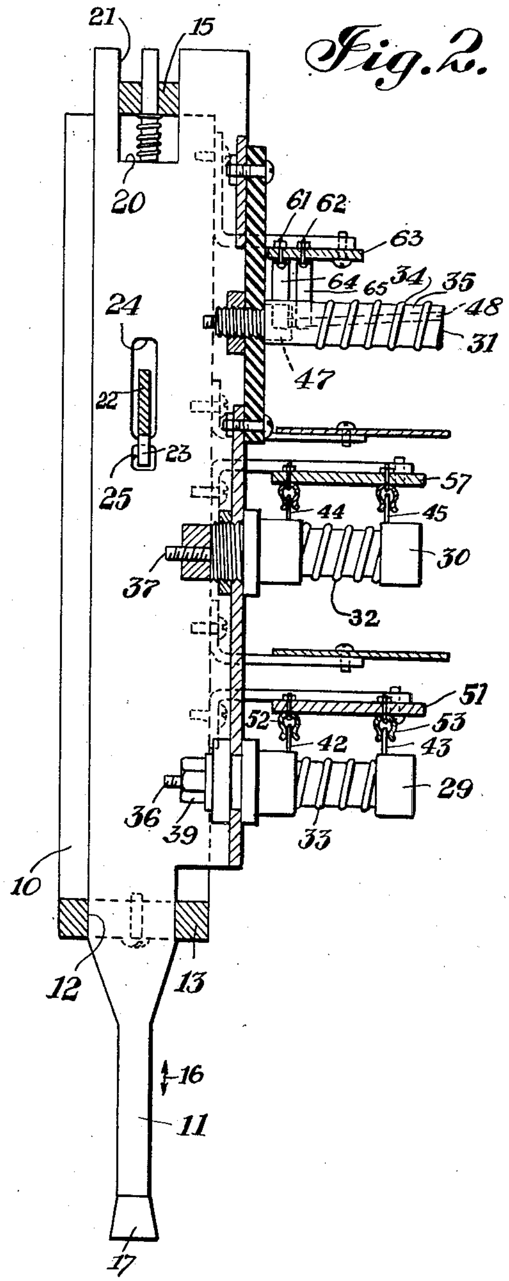
Fig. 2 is a cross section through the push button tuning arrangement shown in Fig. 1 along line 2—2 of Fig. 1, in operative position.

As shown in Figs. 1 and 2, my new push button tuning arrangement includes a rigid frame 10 mounted on the chassis of a television receiver, a plurality of push button rods 11 passing through corresponding openings 12 and 14 in the cross bars 13 and 15, respectively, guided by the same so that the rods are adapted to slide in direction of the arrow 16 whenever pressure is exerted against one of the buttons 17 provided at the front ends of rods 11.

Springs 18 are provided at the rear ends of the push button rods 11 tending to force the same outward in direction of arrow 19. These springs 18 abut at their rear ends against the cross bar 15 and at their front ends against the faces 20 formed by the cut-outs 21 in the push button rods 11.

In order to hold any one of the push button rods in pushed-in operative position shown in Fig. 2, a latch bar 22 is arranged as shown. This latch bar 22 is slidable in axial direction and provided with a plurality of hook-shaped projections 23 adapted to engage in well known manner the apertures 24 and 25 provided in the push button rods 11.

As operation of such push button arrangements is well known to everybody skilled in this art, I will not describe it in detail. It should only be noted that an arrangement of this type operates in such a manner that if one of the push button rods is in pushed-in operative position and it is desired to move it outwards into inoperative position, this can be attained by moving any of the other push button rods inward in direction of arrow 16. This will result in sliding of the latch bar 22 in direction of arrow 26, disengaging the inward moved push button rod and permitting the corresponding spring to move this rod in direction of arrow 19 into inoperative position.

Figure 3:
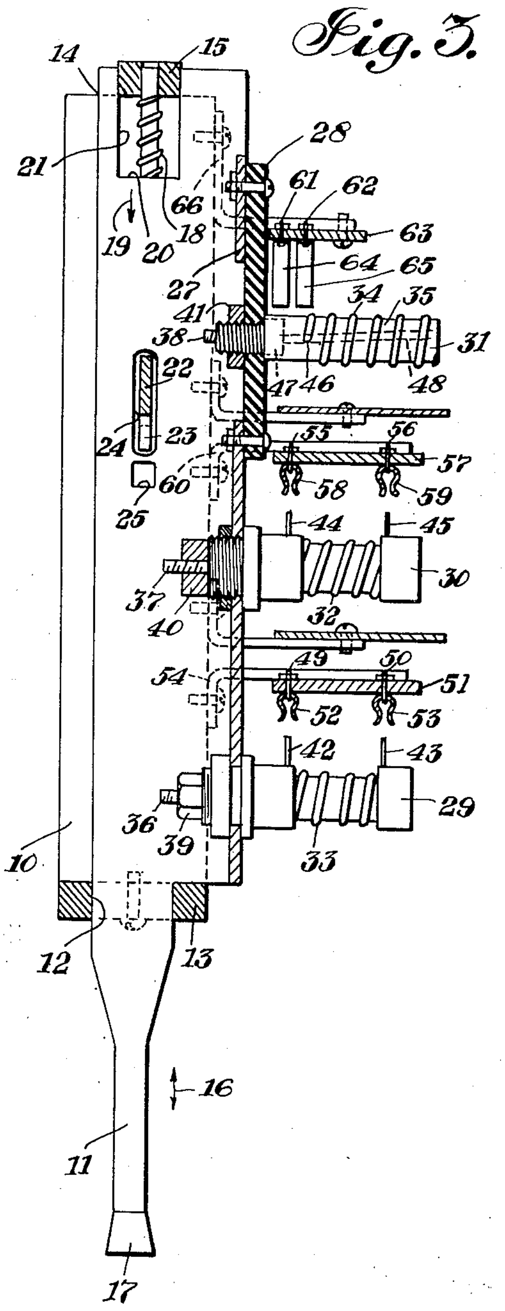
Fig. 3 is a cross section through the push button tuning arrangement shown in Fig. 1 along line 3—3 of Fig. 1, in inoperative position.

In accordance with my present invention, I provide on top of each of the push button rods 11 a supporting platform 27 as clearly shown in Figs. 1 to 3. This platform might consist of one piece. However, in certain cases it is advisable to make the platform 27 of several pieces, e. g. by providing in the platform a cut-out and mounting on the platform an insulating plate 28 covering this cut-out, as shown.

The supporting platform 27 carries the three tuning elements 29, 30 and 31, which will be described farther below in detail. It should only be mentioned that the tuning elements 29 and 30 include tuning coils 33 and 32, respectively, of usual design, while the tuning element 31 consists in the embodiment shown of a quarter wave line section including a coil-shaped metallic coating 34 on an insulating tube 35.

The above described three tuning elements are mounted by means of screws 36, 37 and 38 on platform 27 and insulating plate 28, respectively. Nuts 39, 40 and 41 engaging the screws 36, 37 and 38 serve to hold the tuning element in proper position.

Each of the tuning elements 29, 30 and 31 is provided with two contact members: the tuning element 29 is equipped with the contact members 42 and 43 firmly secured to the ends of the tuning coil 43; the tuning element 30 is equipped with the contact members 44 and 45 firmly secured to the ends of the tuning coil 32; and the line section 31 is provided with the contact plate 46 provided at the end of the coil-shaped metal coating 34 on the outer surface of the insulating tube 35 and the contact spring 47 connected to the end of the straight strip-shaped coating 48 on the inner surface of tube 35.

In addition to the movable contact members described in the preceding paragraph, I provide three pairs of stationary contact members cooperating with the movable contact members. All these stationary contact members are firmly mounted on frame 10 so that they contact the corresponding movable contact members when one of the push button rods 11 is moved into operative position.

Each of the stationary contact members consists of a metallic conductor provided with a plurality of contacts corresponding to the movable contact members:

Thus, I provide two conductors 49 and 50 mounted on the insulating strip-shaped support 51 and electrically connected with the contact springs 52 and 53, respectively. The insulating support 51 is mounted by means of brackets 54 on frame 10, as clearly shown in Figs. 1 and 2. The contact springs 52 and 53 are arranged so as to be adapted to engage the movable contact members 42 and 43 respectively when the same are in operative position as shown in Fig. 2.

Similarly, I provide the conductors 55 and 56 mounted on the insulating plate 57 and electrically connected with the contact springs 58 and 59, respectively. These contact springs cooperate with the movable contact members 44 and 45, respectively, as shown in Fig. 2. The insulating plate 57 is supported by the brackets 60 so that the contact springs 58 and 59 are in proper position engaging the contact members 44 and 45 when the push button rod 11 is pushed inward into the position shown in Fig. 2.

Finally, the conductors 61 and 62 are mounted on the insulating plate 63 and electrically connected with the contact springs 64 and 65, respectively. These contact springs are adapted to engage the contact plates 46 and 47, respectively, when the line section 35 is in operative position shown in Fig. 2. The insulating plate 63 together with the conductors 61 and 62 and the contact springs 64 and 65 are mounted on frame 10 by means of the brackets 66 as shown.

My new above described television switch arrangement is operated as follows:

In order to switch from one television channel to another, it is only necessary to press against that push button rod 11 which carries those tuning elements which correspond to the desired channel. By doing so, all three tuning elements are moved inward and connected by the movable contact members forming part of the same with the stationary contact springs included in the television circuit. As already mentioned above, by an arrangement of this type it is possible to keep the length of the connecting wires to a minimum and to greatly reduce the number of contacts in each path, thereby substantially reducing the wiring reactances due to long wires and numerous contact members.

Although already mentioned above, I wish to stress that each of the push button rods 11 carries differently tuned tuning elements each adjusted to a specific television channel.

Figure 4:
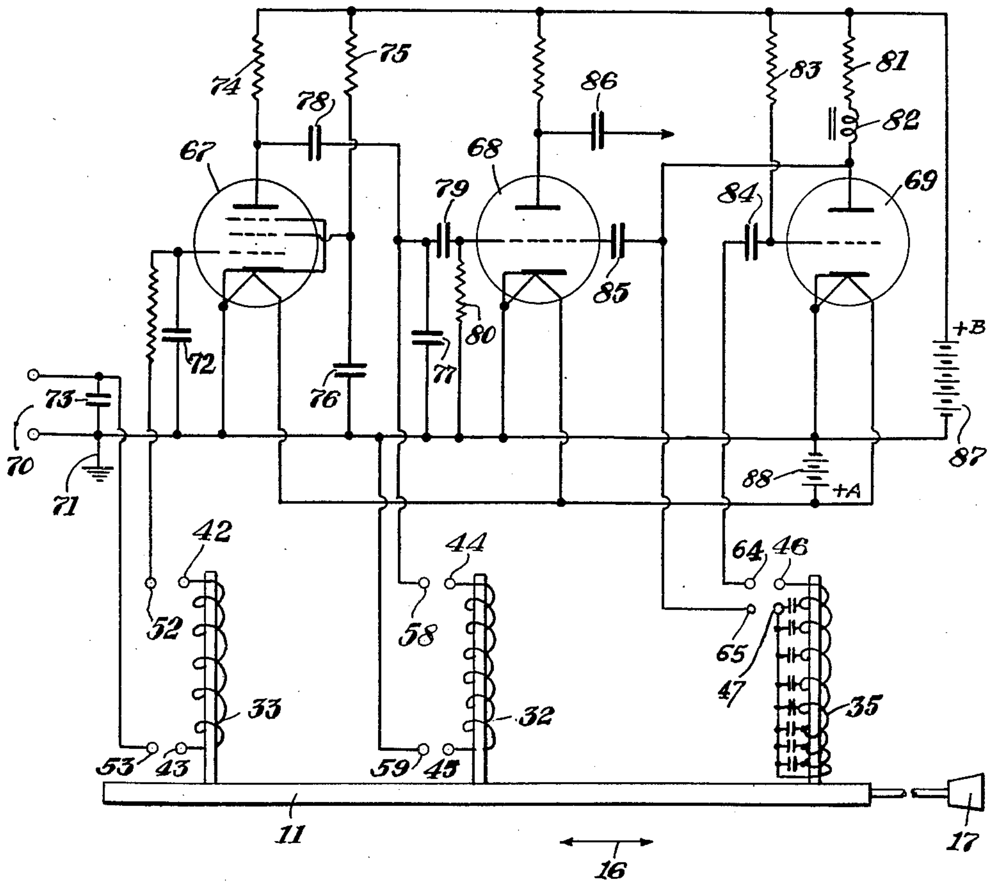
Fig. 4 is a circuit diagram of a television circuit embodying a push button tuning arrangement according to my present invention.

A switch arrangement of the above type might be used in television receivers of various types. However, I have found that a switch arrangement of the type proposed by me is of special advantage if used in combination with a television circuit of the type shown in Fig. 4.

This television circuit includes three tubes of which the first, namely, tube 67 performs the radio frequency amplification, the second, namely, tube 68, mixes the output of tube 67 with the oscillations generated by the local oscillator, and the third, namely, tube 69, activates the local oscillator circuit.

The television signals are fed from a low impedance feeder cable to the terminal 70 and ground 71. The input tuning circuit of the receiver consists of the tube input capacity shown as a separate condenser 72, a matching condenser 73 and the tuning coil 33. This tuning coil 33—shown also in Figs. 2 and 3—is connected by means of the movable contact members 42 and 43 and the stationary contact members 52 and 53 to the rest of the circuit.

The television signals stepped up by the above described input tuning circuit are fed to the signal grid of tube 67. The anode of this tube is supplied with positive potential via the resistance 74; the screen grid of the tube is supplied with positive potential via the resistance 75 and is decoupled by condenser 76.

The coupling circuit between the radio frequency amplifier stage described above and the mixer tube 68 is provided by the circuit made up of the input capacity and/or external capacity 77 and the tuning coil 32. This tuning coil 32 is, as clearly shown in Fig. 2, connected with the circuit by means of the movable contact members 44 and 45 and the corresponding stationary contact members 58 and 59, respectively.

The coupling circuit is coupled to the radio frequency amplifier stage by the condenser 78 and to the mixer by condenser 79. The grid leak resistor 80 serves to establish adequate bias by rectification of local oscillator power.

The local oscillator tube 69 is fed at its anode with high voltage via the resistance 81 and choke 82 and suitably biased at its grid via resistance 83.

This tube 69 is tuned by the line section 35 which is connected by means of the movable contacts 46 and 47 and the corresponding stationary contact springs 64 and 65, respectively, on the one hand to the anode of tube 69 and on the other hand to the grid of this tube via condenser 84.

The output of the above described local oscillator tube 69 is coupled to the grid of the mixer tube 68 via condenser 85, and the output of this mixer tube is taken off its anode via condenser 86.

All three tubes included in the circuit are supplied with high voltage from source 87 and with heater voltage from source 88.

The tuning coils 32 and 33 and the line section 35 are mounted on the push button rod 11 as described above and slidable into contact with the corresponding stationary contact members by pressing against the knob 17.

It is evident that, as shown in Figs. 1 to 3, a plurality of groups of tuning elements 32, 33 and 35 are provided; each of these groups of tuning elements is carried by one of the push button rods 11 and can be included into the television circuit as described above so as to adapt the same to different television channels.

It will be understood that each of the elements described above, or two or more together, may also find a useful application in other types of electrical signal receivers differing from the types described above.

While I have illustrated and described the invention as embodied in television receivers, I do not intend to be limited to the details shown, since various modifications and structural changes may be made without departing in any way from the spirit of my invention.

With further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In a television receiver an electrical television receiver circuit; a plurality of stationary contact member arrangements included in said electrical television receiver circuit; a movable push button switch; a plurality of electrical tuning elements forming part of said electrical television receiver circuit and adapted to be moved by said movable push button switch member; a plurality of movable contact member arrangements also adapted to be moved by said movable push button switch member, each of said movable contact member arrangements permanently connected with a termination of one of said electrical tuning elements; and guiding means for said movable push button switch member constructed and arranged so as to be adapted to guide said movable push button switch member during its movement between inoperative position with said movable contact member arrangements out of contact with the corresponding stationary contact member arrangements and operative position with said movable contact member arrangements moved into contact with the corresponding stationary contact member arrangements.

2. In a television receiver an electrical television receiver circuit; a plurality of pairs of stationary contact members included in said electrical television receiver circuit; a movable push button switch member; a supporting shelf-like member constructed and arranged so as to be adapted to be moved by said movable push button switch member; a plurality of electrical tuning elements forming part of said electrical television receiver circuit and mounted on said supporting shelf-like member; a plurality of pairs of movable contact members, each of said pairs of movable contact members mounted on and permanently connected with a termination of one of said electrical tuning elements; and guiding means for said movable push button switch member constructed and arranged so as to be adapted to guide during its movement said movable push button switch member between inoperative position with said pairs of movable contact members out of contact with the corresponding pairs of stationary contact members and operative position with said pairs of movable contact members moved into contact with the corresponding pairs of stationary contact members.

3. In a television receiver an electrical television receiver circuit; a radio frequency amplifier stage forming part of said electrical television receiver circuit; a mixer stage forming part of said electrical television receiver circuit; a local oscillator stage forming part of said electrical television receiver circuit; a movable switch member included in said electrical television receiver circuit; a first tuning member forming part of said radio frequency amplifier stage and mounted on said movable switch member; a second tuning member forming part of said mixer stage and mounted on said movable switch member; a line section member forming part of said local oscillator circuit and mounted on said movable switch member; first movable contact means mounted on said first tuning member electrically connected with a termination of the same and carried together with said first tuning member by said movable switch member; second movable contact means mounted on said second tuning member electrically connected with a termination of the same and carried together with said second tuning member by said movable switch member; third movable contact means mounted on said line section member electrically connected with a termination of the same and carried together with said line section member by said movable switch member; first stationary contact means arranged and constructed so as to be adapted to cooperate with and engage said first movable contact means; second stationary contact means arranged and constructed so as to be adapted to cooperate with and engage said second movable contact means; third stationary contact means arranged and constructed so as to be adapted to cooperate with and engage said third movable contact means; and guiding means for said movable switch member constructed and arranged so as to be adapted to guide during its movement said movable switch member between inoperative position with said movable contact means out of contact with the corresponding stationary contact means and operative position with said movable contact means moved into contact with the corresponding stationary contact means.

4. In a television receiver an electrical television receiver circuit; a radio frequency amplifier stage forming part of said electrical television receiver circuit; a mixer stage forming part of said electrical television receiver circuit; a local oscillator stage forming part of said electrical television receiver circuit; a movable switch member included in said electrical television receiver circuit; a first tuning member forming part of said radio frequency amplifier stage and mounted on said movable switch member; a second tuning member forming part of said mixer stage and mounted on said movable switch member; a line section member forming part of said local oscillator circuit and mounted on said movable switch member; a first movable pair of contact members mounted on said first tuning member electrically connected with a termination of the same and carried together with said first tuning member by said movable switch member; a second movable pair of contact members mounted on said second tuning member electrically connected with a termination of the same and carried together with said second tuning member by said movable switch member; a third movable pair of contact members mounted on said line section member electrically connected with a termination of the same and carried together with said line section member by said movable switch member; a first stationary pair of contact members arranged and constructed so as to be adapted to cooperate with and engage said first pair of movable contact members; a second stationary pair of contact members arranged and constructed so as to be adapted to cooperate with and engage said second movable pair of contact members; a third stationary pair of contact members arranged and constructed so as to be adapted to cooperate with and engage said third movable pair of contact members; and guiding means for said movable switch member constructed and arranged so as to be adapted to guide during its movement said movable switch member between inoperative position with said movable pair of contact members out of contact with the corresponding stationary pair of contact members and operative position with said movable pair of contact members moved into contact with the corresponding stationary pair of contact members.

5. In a television receiver an electrical television receiver circuit; a radio frequency amplifier stage forming part of said electrical television receiver circuit; a mixer stage forming part of said electrical television receiver circuit; a local oscillator stage forming part of said electrical television receiver circuit; a movable switch member included in said electrical television receiver circuit; a first tuning member comprising a metallic coil forming part of said radio frequency amplifier stage and movably carried by said movable switch member; a second tuning member comprising a metallic coil forming part of said mixer stage and movably carried by said movable switch member; a line section member comprising a metallic coil forming part of said local oscillator circuit and movably carried by said movable switch member; a first movable pair of contact members mounted on said first tuning member electrically connected to the ends of said metallic coil forming part of the same and carried together with said first tuning member of said movable switch member; a second movable pair of contact members mounted on said second tuning member electrically connected to the ends of said metallic coil forming part of the same and carried together with said second tuning member by said movable switch member; a third movable pair of contact members mounted on said line section member electrically connected to the ends of said metallic coil forming part of the same and carried together with said line section member by said movable switch member; a first stationary pair of contact members arranged and constructed so as to be adapted to cooperate with and engage said first pair of movable contact members; a second stationary pair of contact members arranged and constructed so as to be adapted to cooperate with and engage said second movable pair of contact members; a third stationary pair of contact members arranged and constructed so as to be adapted to cooperate with and engage said third movable pair of contact members; and guiding means for said movable switch member constructed and arranged so as to be adapted to guide said movable switch member between inoperative position with said movable pair of contact members out of contact with the corresponding stationary pair of contact members and operative position with said movable pair of contact members moved into contact with the corresponding stationary pair of contact members.

6. In a television receiver an electrical television receiver circuit; a plurality of pairs of stationary contact members included in said electrical television receiver circuit; a plurality of movable switch members; a plurality of groups of electrical tuning elements forming part of said electrical television receiver circuit, each of said groups of electrical tuning elements combined with one of said movable switch members movable together with the same; a plurality of groups of pairs of movable contact members, each of said groups of pairs of movable contact members combined with one of said movable switch members and each of said pairs of movable contact members of each of said groups of pairs of movable contact members permanently connected with a termination of one of said electrical tuning elements forming part of said groups of tuning elements combined with said movable switch members; and a plurality of guiding means for said movable push button switch members, each of said guiding means constructed and arranged so as to be adapted to guide one of said movable switch members between inoperative position with the group of pairs of movable contact members combined with said switch member out of contact with the corresponding pairs of stationary contact members and operative position with said group of pairs of movable contact members moved into contact with the corresponding pairs of stationary contact members.

7. In a television receiver an electrical television receiver circuit; a radio frequency amplifier stage forming part of said electrical television receiver circuit; a mixer stage forming part of said electrical television receiver circuit; a local oscillator stage forming part of said electrical television receiver circuit; a plurality of movable switch members included in said electrical television receiver circuit; a plurality of differently tuned first tuning members forming part of said radio frequency amplifier stage, each of said differently tuned first tuning members movably carried by one of said movable switch members; a plurality of differently tuned second tuning members forming part of said mixer stage, each of said differently tuned second tuning members movably carried by one of said movable switch members; a plurality of differently adjusted line section members forming part of said local oscillator stage, each of said differently adjusted line section members movably carried by one of said movable switch members; a plurality of first movable contact means, each of said first movable contact means mounted on one of said differently tuned first tuning members electrically connected with a termination of the same and carried together with said first tuning member by the movable switch member carrying said first tuning member; a plurality of second movable contact means, each of said second movable contact means mounted on one of said differently tuned second tuning members electrically connected with a termination of the same and carried together with said second tuning member by the movable switch member carrying said second tuning member; a plurality of third movable contact means, each of said third movable contact means mounted on one of said differently adjusted line section members electrically connected with a termination of the same and carried together with said line section member by a movable switch member carrying said line section member; first stationary contact means arranged and constructed so as to be adapted to cooperate with and engage each of said first movable contact means; second stationary contact means arranged and constructed so as to be adapted to cooperate with an engage each of said second movable contact means; third stationary contact means arranged and constructed so as to be adapted to cooperate with and engage each of said third movable contact means; and a plurality of guiding means for said movable switch members, each of said guiding means constructed and arranged so as to be adapted to guide one of said movable switch members between inoperative position with the movable contact means carried by said movable switch member out of contact with the corresponding stationary contact means and operative position with the movable contact means carried by said movable switch member moved into contact with the corresponding stationary contact means.

8. In a television receiver an electrical television receiver circuit; a radio frequency amplifier stage forming part of said electrical television receiver circuit; a mixer stage forming part of said electrical television receiver circuit; a local oscillator stage forming part of said electrical television receiver circuit; a plurality of movable switch members included in said electrical television receiver circuit; a plurality of differently tuned first tuning members forming part of said radio frequency amplified stage, each of said differently tuned first tuning members movably carried by one of said movable switch members; a plurality of differently tuned second tuning members forming part of said mixer stage, each of said differently tuned second tuning members movably carried by one of said movable switch members; a plurality of differently adjusted line section members forming part of said local oscillator stage, each of said differently adjusted line section members movably carried by one of said movable switch members; a plurality of first movable pairs of contact members, each of said first movable pairs of contact members mounted on one of said differently tuned first tuning members electrically connected with a termination of the same and carried together with said first tuning member by the movable switch member carrying said first tuning member; a plurality of second movable pairs of contact members, each of said second movable pairs of contact members mounted on one of said differently tuned second tuning members electrically connected with a termination of the same and carried together with said second tuning member by the movable switch member carrying said second tuning member; a plurality of third movable pairs of contact members, each of said third movable pairs of contact members mounted on one of said differently adjusted line section members electrically connected with a termination of the same and carried together with said line section member by the movable switch member carrying said line section members; a first stationary pair of contact members arranged and constructed so as to be adapted to cooperate with and engage each of said first movable pairs of contact members; a second stationary pair of contact members arranged and constructed so as to be adapted to cooperate with and engage each of said second movable pairs of contact members; a third stationary pair of contact members arranged and constructed so as to be adapted to cooperate with and engage each of said third movable pairs of contact members; and a plurality of guiding means for said movable switch members, each of said guiding means constructed and arranged so as to be adapted to guide one of said movable switch members between inoperative position with the movable pairs of contact members carried by said movable switch member out of contact with the corresponding stationary pairs of contact members carried by said movable switch member into contact with the corresponding stationary pair of contact members.

9. In a television receiver an electrical television receiver circuit; a radio frequency amplifier stage forming part of said electrical television receiver circuit; a mixer stage forming part of said electrical television receiver circuit; a local oscillator stage forming part of said electrical television receiver circuit; a plurality of movable switch members included in said electrical television receiver circuit; a plurality of differently tuned first tuning members forming part of said radio frequency amplifier stage; each of said differently tuned first tuning members comprising a metallic coil movably carried by one of said movable switch members; a plurality of differently tuned second tuning members forming part of said mixer stage, each of said differently tuned second tuning members comprising a metallic coil movably carried by one of said movable switch members; a plurality of differently adjusted line section members forming part of said local oscillator stage, each of said differently adjusted line section members comprising a metallic coil movably carried by one of said movable switch members; a plurality of first movable pairs of contact members, each of said first movable pairs of contact members mounted on one of said differently tuned first tuning members electrically connected to the ends of the metallic coil forming part of the same and carried together with said first tuning member by the movable switch member carrying said first tuning member; a plurality of second movable pairs of contact members, each of said second movable pairs of contact members mounted on one of said differently tuned second tuning members electrically connected with the ends of the metallic coil forming part of the same and carried together with said second tuning member by the movable switch member carrying said second tuning member; a plurality of third movable pairs of contact members, each of said third movable pairs of contact members mounted on one of said differently adjusted line section members electrically connected with the ends of the metallic coil forming part of the same and carried together with said line section member by the movable switch member carrying said line section members; a first stationary pair of contact members arranged and constructed so as to be adapted to cooperate with and engage each of said first movable pairs of contact members; a second stationary pair of contact members arranged and constructed so as to be adapted to cooperate with and engage each of said second movable pairs of contact members; a third stationary pair of contact members arranged and constructed so as to be adapted to cooperate with and engage each of said third movable pairs of contact members; and a plurality of guiding means for said movable switch members, each of said guiding means constructed and arranged so as to be adapted to guide one of said movable switch members between inoperative position with the movable pairs of contact members carried by said movable switch member out of contact with the corresponding stationary pairs of contact members and operative position with the movable pairs of contact members carried by said movable switch member into contact with the corresponding stationary pair of contact members.

10. A push button switch member comprising a stationary frame; a push button rod slidably mounted in said stationary frame; a supporting platform combined with said push button rod so as to be slidable together with the same; stationary contact means mounted on said stationary frame; an electrical tuning element mounted on said supporting platform slidably together with the same and said push button rod; slidable contact means mounted on said electrical tuning element electrically connected with at least one termination of the same; and guiding means forming part of said stationary frame and arranged and constructed so as to be adapted to guide said push button rod together with said supporting platform, said electrical tuning element and said slidable contact means forming part of the same between inoperative position with said slidable contact means out of contact with said stationary contact means and operative position with said slidable contact means moved into contact with said stationary contact means.

11. A push button switch member comprising a stationary frame; a push button rod slidably mounted in said stationary frame; a supporting platform constructed and arranged so as to be slidable together with said push button rod; a pair of stationary contact members mounted on said stationary frame; an electrical tuning element including a metallic coil mounted on said supporting platform slidably together with the same and said push button rod; a pair of slidable contact members mounted on said electrical tuning element electrically connected with the ends of said metallic coil forming part of said electrical tuning element; and guiding means forming part of said stationary frame and arranged and constructed so as to be adapted to guide said push button rod together with said supporting platform, said electrical tuning element and said pair of slidable contact members electrically connected with the ends of said metallic coil forming part of said electrical tuning element between inoperative position with said pair of slidable contact members out of contact with said pair of stationary contact members and operative position with said pair of slidable contact members moved into contact with said pair of stationary contact members.

12. A push button switch member comprising a stationary frame; a push button rod slidably mounted in said stationary frame; a supporting platform moved by said push button rod; a plurality of contact means mounted on said stationary frame; a plurality of electrical tuning elements mounted on said supporting platform slidably together with the same and said push button rod; a plurality of slidable contact means, each of said slidable contact means mounted on one of said electrical tuning elements electrically connected with a termination of the same; and guiding means forming part of said stationary frame and arranged and constructed so as to be adapted to guide said push button rod together with said supporting platform, said electrical tuning elements and said plurality of slidable contact means electrically connected with terminations of said electrical tuning elements between inoperative position with said plurality of slidable contact means out of contact with the corresponding stationary contact means and operative position with said plurality of slidable contact means moved into contact with the corresponding stationary contact means.

13. A push button switch member comprising a stationary frame; a push button rod slidably mounted in said stationary frame; a supporting platform carried by said push button rod; a plurality of pairs of contact members mounted on said stationary frame; a plurality of electrical tuning elements each including a metallic coil mounted on said supporting platform slidably together with the same and said push button rod; a plurality of pairs of slidable contact members, each of said pairs of slidable contact members mounted on one of said electrical tuning elements electrically connected to the ends of the metallic coil forming part of said electrical tuning elements; and guiding means forming part of said stationary frame and arranged and constructed so as to be adapted to guide said push button rod together with said supporting platform, said electrical tuning elements and said plurality of pairs of slidable contact members between inoperative position with said plurality of pairs of slidable contact members out of contact with the corresponding pairs of stationary contact members and operative position with said plurality of pairs of slidable contact members moved into contact with the corresponding pairs of stationary contact members.

HEINZ E. KALLMANN.

REFERENCES CITED

The following references are of record in the file of this patent:

UNITED STATES PATENTS

| Number | Name | Date |
|---|---|---|
| 1,697,196 | Macgahan | Jan. 1, 1929 |
| 2,154,778 | Schnell | Apr. 18, 1939 |
| 2,347,315 | Fill | Apr. 25, 1944 |
| 2,354,148 | Shaw | July 18, 1944 |
| 2,438,454 | Riebe | Mar. 23, 1948 |